(12) United States Patent
Rothblum et al.

(10) Patent No.: US 9,276,635 B2
(45) Date of Patent: Mar. 1, 2016

(54) DEVICE, SYSTEM, AND METHOD FOR COMMUNICATING WITH A POWER INVERTER USING POWER LINE COMMUNICATIONS

(75) Inventors: Philip Rothblum, Austin, TX (US);
Brian T. Kuhn, Austin, TX (US);
Jonathan Ehlmann, Austin, TX (US);
Patrick L. Chapman, Austin, TX (US)

(73) Assignee: SUNPOWER CORPORATION, San Jose, CA (US)

( * ) Notice: Subject to any disclaimer, the term of this patent is extended or adjusted under 35 U.S.C. 154(b) by 633 days.

(21) Appl. No.: 13/538,723

(22) Filed: Jun. 29, 2012

(65) Prior Publication Data

US 2014/0003110 A1   Jan. 2, 2014

(51) Int. Cl.
| | | |
|---|---|---|
| G06F 13/42 | (2006.01) | |
| H04B 3/54 | (2006.01) | |
| H02J 3/38 | (2006.01) | |
| H02J 13/00 | (2006.01) | |

(52) U.S. Cl.
CPC ............... *H04B 3/544* (2013.01); *H04B 3/54* (2013.01); *H02J 3/383* (2013.01); *H02J 3/387* (2013.01); *H02J 13/002* (2013.01); *Y02E 10/563* (2013.01); *Y02E 40/72* (2013.01); *Y04S 10/12* (2013.01); *Y04S 10/123* (2013.01)

(58) Field of Classification Search
CPC .............. G04C 10/04; H04B 3/54; H02J 3/38
USPC ................ 340/12.23, 3.1, 451.1, 635; 307/84
See application file for complete search history.

(56) References Cited

U.S. PATENT DOCUMENTS

| | | |
|---|---|---|
| 3,670,230 A | 6/1972 | Rooney et al. |
| 4,114,048 A | 9/1978 | Hull |
| 4,217,633 A | 8/1980 | Evans |
| 4,277,692 A | 7/1981 | Small |
| 4,287,465 A | 9/1981 | Godard et al. |
| 4,651,265 A | 3/1987 | Stacey et al. |
| 4,661,758 A | 4/1987 | Whittaker |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

International Search Report and Written Opinion received for PCT Patent Application No. PCT/US2013/048233, mailed on Oct. 18, 2013, 10 pages.

(Continued)

*Primary Examiner* — Vernal Brown
(74) *Attorney, Agent, or Firm* — Barnes & Thornburg LLP

(57) ABSTRACT

A device, system, and method for communicating with a power inverter of an array of inverters includes transmitting a relay message from an inverter array controller to a relay inverter in response to failing to receive a response from at least one power inverter of the array. The relay inverter is configured to retransmit a message from the inverter array controller to a non-responsive power inverter of the array of inverters in response to receiving the relay message. The relay inverter may subsequently retransmit a reply received from the non-responsive power inverter to the inverter array controller or to another power inverter of the array of inverters.

27 Claims, 6 Drawing Sheets

(56) References Cited

U.S. PATENT DOCUMENTS

| | | |
|---|---|---|
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |
| 5,148,043 A | 9/1992 | Hirata et al. |
| 5,160,851 A | 11/1992 | McAndrews |
| 5,191,519 A | 3/1993 | Kawakami |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,886,890 A | 3/1999 | Ishida et al. |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 | 8/2006 | Cutler |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen et al. |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,660,139 B2 | 2/2010 | Garabandic |
| 7,667,610 B2 | 2/2010 | Thompson |
| 7,710,752 B2 | 5/2010 | West |
| 7,733,679 B2 | 6/2010 | Luger et al. |
| 7,768,155 B2 | 8/2010 | Fornage |
| 7,777,587 B2 | 8/2010 | Stevenson et al. |
| 7,796,412 B2 | 9/2010 | Fornage |
| RE41,965 E | 11/2010 | West |
| 7,839,022 B2 | 11/2010 | Wolfs |
| 7,855,906 B2 | 12/2010 | Klodowski et al. |
| RE42,039 E | 1/2011 | West et al. |
| 7,884,500 B2 | 2/2011 | Kernahan |
| 7,899,632 B2 | 3/2011 | Fornage et al. |
| 7,916,505 B2 | 3/2011 | Fornage |
| 2001/0043050 A1 | 11/2001 | Fisher |
| 2002/0017822 A1 | 2/2002 | Umemura et al. |
| 2002/0196026 A1 | 12/2002 | Kimura et al. |
| 2005/0213272 A1 | 9/2005 | Kobayashi |
| 2006/0067137 A1 | 3/2006 | Udrea |
| 2006/0083039 A1 | 4/2006 | Oliveira |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0189182 A1* | 8/2007 | Berkman et al. ............ 370/252 |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0183338 A1 | 7/2008 | Kimball et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0080177 A1* | 4/2010 | Rofougaran ................ 370/329 |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0139945 A1 | 6/2010 | Dargatz |
| 2010/0175338 A1 | 7/2010 | Garcia Cors |
| 2010/0176771 A1 | 7/2010 | Fieldhouse et al. |
| 2010/0181830 A1 | 7/2010 | Fornage et al. |
| 2010/0195357 A1 | 8/2010 | Fornage et al. |
| 2010/0214808 A1 | 8/2010 | Rodriguez |
| 2010/0222933 A1 | 9/2010 | Smith et al. |
| 2010/0236612 A1 | 9/2010 | Khajehoddin et al. |
| 2010/0263704 A1 | 10/2010 | Fornage et al. |
| 2010/0283325 A1 | 11/2010 | Marcianesi et al. |
| 2010/0309695 A1 | 12/2010 | Fornage |
| 2011/0012429 A1 | 1/2011 | Fornage |
| 2011/0019444 A1 | 1/2011 | Dargatz et al. |
| 2011/0026281 A1 | 2/2011 | Chapman et al. |
| 2011/0026282 A1 | 2/2011 | Chapman et al. |
| 2011/0043160 A1 | 2/2011 | Serban |
| 2011/0049990 A1 | 3/2011 | Amaratunga et al. |

(56) References Cited

U.S. PATENT DOCUMENTS

| | | |
|---|---|---|
| 2011/0051820 A1 | 3/2011 | Fornage |
| 2011/0130889 A1 | 6/2011 | Khajehoddin et al. |
| 2011/0267857 A1* | 11/2011 | Fornage .......................... 363/97 |
| 2012/0140534 A1 | 6/2012 | Inukai et al. |

FOREIGN PATENT DOCUMENTS

| | | |
|---|---|---|
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| JP | 2000023365 A | 1/2000 |
| JP | 2009032743 A | 2/2009 |
| KR | 1020100082669 A | 7/2010 |
| NL | 1021582 C2 | 4/2004 |
| NL | 1021591 C2 | 4/2004 |
| WO | 2004008619 A2 | 1/2004 |
| WO | 2004040415 A2 | 5/2004 |
| WO | 2004100348 A1 | 11/2004 |
| WO | 2004100348 A8 | 12/2005 |
| WO | 2006048688 A1 | 5/2006 |
| WO | 2007080429 A2 | 7/2007 |
| WO | 2009081205 A2 | 7/2009 |
| WO | 2009081205 A3 | 10/2009 |
| WO | 2009134756 A1 | 11/2009 |
| WO | 2014004855 A1 | 1/2014 |

OTHER PUBLICATIONS

Ando et al., "Development of Single Phase UPS Having AC Chopper and Active Filter Ability," IEEE International Conference on Industrial Technology, 10.1109/ICIT.2006.372445, pp. 1498-1503, 2006.

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved Solar Inverter With Wide Input Voltage Range," IEEE 10th Mediterranean Conference, MEleCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

Jung et al., "High-frequency DC Link Inverter for Grid-Connected Photovoltaic System," Conference Record of the Twenty-Ninth IEEE Photovoltaic Specialists Conference, pp. 1410-1413, 2002.

Kern, "SunSine300: Manufacture of an AC Photovoltaic Module, Final Report, Phases I & II, Jul. 25, 1995-Jun. 30, 1998," NREL/SR-520-26085, 1999, 32 pages.

Khajehoddin et al., "A Nonlinear Approach to Control Instantaneous Power for Single-phased Grid-connected Photovoltaic Systems," IEEE Energy Conversion Congress and Exposition (Ecce), pp. 2206-2212, 2009.

Khajehoddin et al., "A Novel Topology and Control Strategy for Maximum Power Point Trackers and Multi-string Grid-connected PV Inverters," Applied Power Electronics Conference, APECO8, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESCO8, pp. 66-69, 2008.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kern, "Inverter Technology for the Solar Industry," Siemens Energy & Automation, 2009, 20 pages.

(56) References Cited

OTHER PUBLICATIONS

Curran, "Grid-Connected Solar Microinverter Reference Design," Microchip Technology Incorporated, 2010, 31 pages.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l Conf. Power Electronics, vol. 1, pp. 559-564, 1996.

Takahashi et al., "Electrolytic Capacitor-Less PWM Inverter," in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A $1\phi$ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A $1\phi$ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected Inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the PHOTOENERGYTM Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

Kutkut, "PV Energy Conversion and System Integration," Florida Energy Systems Consortium, 2009, 24 pages.

Kwon et al., "High-efficiency Module-integrated Photovoltaic Power Conditioning System," IET Power Electronics, doi:10.1049/iet-pel. 2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

(56) References Cited

OTHER PUBLICATIONS

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

\* cited by examiner

DEVICE, SYSTEM, AND METHOD FOR COMMUNICATING WITH A POWER INVERTER USING POWER LINE COMMUNICATIONS

TECHNICAL FIELD

The present disclosure relates, generally, to power inverters for converting direct current (DC) power to alternating current (AC) power and, more particularly, to systems and methods for controlling and communicating with such power inverters.

BACKGROUND

Power inverters convert a DC input power to an AC output power. Some power inverters are configured to convert the DC input power to an AC output power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

In an effort to increase the amount of AC power generated, a large number of power inverters may be used in a single application to form an array of power inverters. In some implementations, each power inverter of the array is incorporated or otherwise associated with an alternative energy source (e.g., solar cell panel) to form an alternative energy source module such as a photovoltaic module. Such power inverters are generally referred to as "microinverters." Communication with each power inverter used in the application is often desirable to, for example, monitor the health or energy output of the power inverters. In some applications, a power inverter controller or manager may be used to control and manage the array of inverters.

SUMMARY

According to on aspect, an inverter array controller for maintaining and communicating with an array of power inverters configured to convert direct current (DC) power generated by an alternative energy source to alternating current (AC) power may include a power line communication circuitry, a processing circuitry, and a memory device. The power line communication circuit may communicate with the array of power inverters over a power line connecting the inverter array controller to each of the power inverters of the array of power inverters. The memory device may have stored therein a plurality of instructions, which when executed by the processing circuitry, result in the inverter array controller transmitting, using the power line communication circuitry, a first message to a power inverter of the array of power inverters; determining whether a response was received from the power inverter; transmitting, in response to failing to receive the response from the power inverter, a relay message to another power inverter of the array of power inverters, the relay message including the first message and instructing the another inverter to transmit the first message to the power inverter; and receiving a response message, transmitted by the another power inverter, from the power inverter.

In some embodiments, the first message is a broadcast message to each power inverter of the array of power inverters that requests each power inverter to respond to the broadcast message. Additionally, in some embodiments, the plurality of instructions further result in the inverter array controller selecting the another power inverter to receive the relay message from the array of power inverters. In some embodiments, selecting the another power inverter may include selecting the another power inverter from the array of power inverters based on a signal characteristic of a communication received from the another power inverter. Additionally, in some embodiments, selecting the another power inverter from the array of power inverters based on signal characteristic of the communication received from the another power inverter in response to the test communication. In some embodiments, the signal characteristic may included, for example, a signal amplitude, a signal integrity, a signal-to-noise ratio, and/or a response time of the communication received from the another power inverter.

Additionally or alternatively, selecting the another power inverter may include identifying the power inverter that did not respond to the first message and selecting the another power inverter based on the identity of the power inverter. For example, in some embodiments, identifying the power inverter may include identifying the location of the power inverter, relative to the other power inverters, within the array of power inverters. Further in some embodiments, transmitting the relay message may include transmitting a first relay message it the another power inverter that instructs the another power inverter to echo the next received message and transmitting a second relay message, including the first message, to the another power inverter.

According to another aspect, a power inverter of an array of power configured to convert direct current (DC) power generated by an alternative energy source to alternating current (AC) power may include a power line communication circuitry, an inverter circuit to convert the DC power to the AC power, and an inverter controller to control operation of the inverter circuit. The power line communication circuit may communicate with an inverter array controller over a power line connecting the power inverter to the inverter array controller and other power inverters of the array of power inverters. The inverter controller may receive a message from the inverter array controller using the power line communication circuit, determine whether the message is a relay message, retransmit, in response to determining the message is a relay message, the relay message to a non-responsive power inverter of the array of power inverters that has not responded to a previous communication from the inverter array controller, and receive, in response to retransmitting the relay message, a response from the non-responsive power inverter; and transmit the response, using the power line communication circuit, to the inverter array controller.

In some embodiments, to determine whether the message received from the inverter array controller is a relay message may include to determine whether the message instructs the power inverter to transmit a message to the non-responsive power inverter. Additionally, in some embodiments, to retransmit the relay message comprises to identify the non-responsive power inverter as a function of the relay message. Further in some embodiments, to retransmit the relay message includes to extract a first message from the relay message, the first message having been previously sent by the inverter array controller and transmit the first message to the non-responsive power inverter.

In some embodiments, the relay message is a second relay message and the inverter controller is further to receive a first relay message from the inverter array controller that instructs the power inverter to echo the next received message from the inverter array controller and receive the second relay message from the inverter array controller. In such embodiments, to retransmit the relay message may include to retransmit, in response to receiving the first and second relay messages, the second relay message to the non-responsive power inverter of the array of power inverter.

According to a further aspect, a method for communicating with an array of power inverters configured to convert direct current (DC) power generated by an alternative energy source to alternating current (AC) power may include transmitting a first message to a power inverter of the array of power inverters; transmitting, in response to failing to receive a response from the power inverter, a relay message to another power inverter of the array of power inverters, the relay message including the first message and instructing the another inverter to transmit the first message to the power inverter; and receiving a response message, transmitted by the another power inverter, from the power inverter. In some embodiments, transmitting the first message and transmitting the relay message may include transmitting the first message and relay message using a power line communications protocol. Additionally, in some embodiments, transmitting the first message comprises transmitting a broadcast message to each power inverter of the array of power inverters that requests each power inverter to respond to the broadcast message.

In some embodiments, the method may further include selecting the another power inverter to receive the relay message from the array of power inverters. In such embodiment, selecting the another power inverter may include selecting the another power inverter from the array of power inverters based on a signal characteristic of a communication received from the another power inverter. For example, in some embodiments, selecting the another power inverter from the array of power inverters based on signal characteristic of the communication received from the another power inverter in response to the test communication. Additionally or alternatively, selecting the another power inverter may include identifying the power inverter that did not respond to the first message and selecting the another power inverter based on the identity of the power inverter. In such embodiments, identifying the power inverter may include identifying the location of the power inverter, relative to the other power inverters, within the array of power inverters. Further, in some embodiments, transmitting the relay message may include transmitting a first relay message to the another power inverter that instructs the another power inverter to echo the next received message and transmitting a second relay message, including the first message, to the another power inverter.

According to yet a further aspect, a method for handling communications in an array of power inverters may include determining, on a power inverter, whether a message received from a inverter array controller is a relay message; retransmitting, in response to determining the message is a relay message, the relay message to a non-responsive power inverter of the array of power inverters that has not responded to a previous communication from the inverter array controller; receiving, in response to retransmitting the relay message, a response from the non-responsive power inverter; and transmitting the response, from the power inverter, to the inverter array controller. In some embodiments, determining whether the message received from the inverter array controller is a relay message may include determining whether the message instructs the power inverter to transmit a message to the non-responsive power inverter.

In some embodiments, retransmitting the relay message may include identifying the non-responsive power inverter as a function of the relay message. For example, in some embodiments, retransmitting the relay message may include extracting a first message from the relay message, the first message having been previously sent by the inverter array controller and transmitting the first message to the non-responsive power inverter. Additionally, in some embodiment, the relay message may be embodied as a second relay message and the method may further include receiving, on the power inverter, a first relay message from the inverter array controller that instructs the power inverter to echo the next received message from the inverter array controller and receiving the second relay message from the inverter array controller. In such embodiments, retransmitting the relay message may include retransmitting, in response to receiving the first and second relay messages, the second relay message to the non-responsive power inverter of the array of power inverter.

DETAILED DESCRIPTION OF THE DRAWINGS

Figure 1:
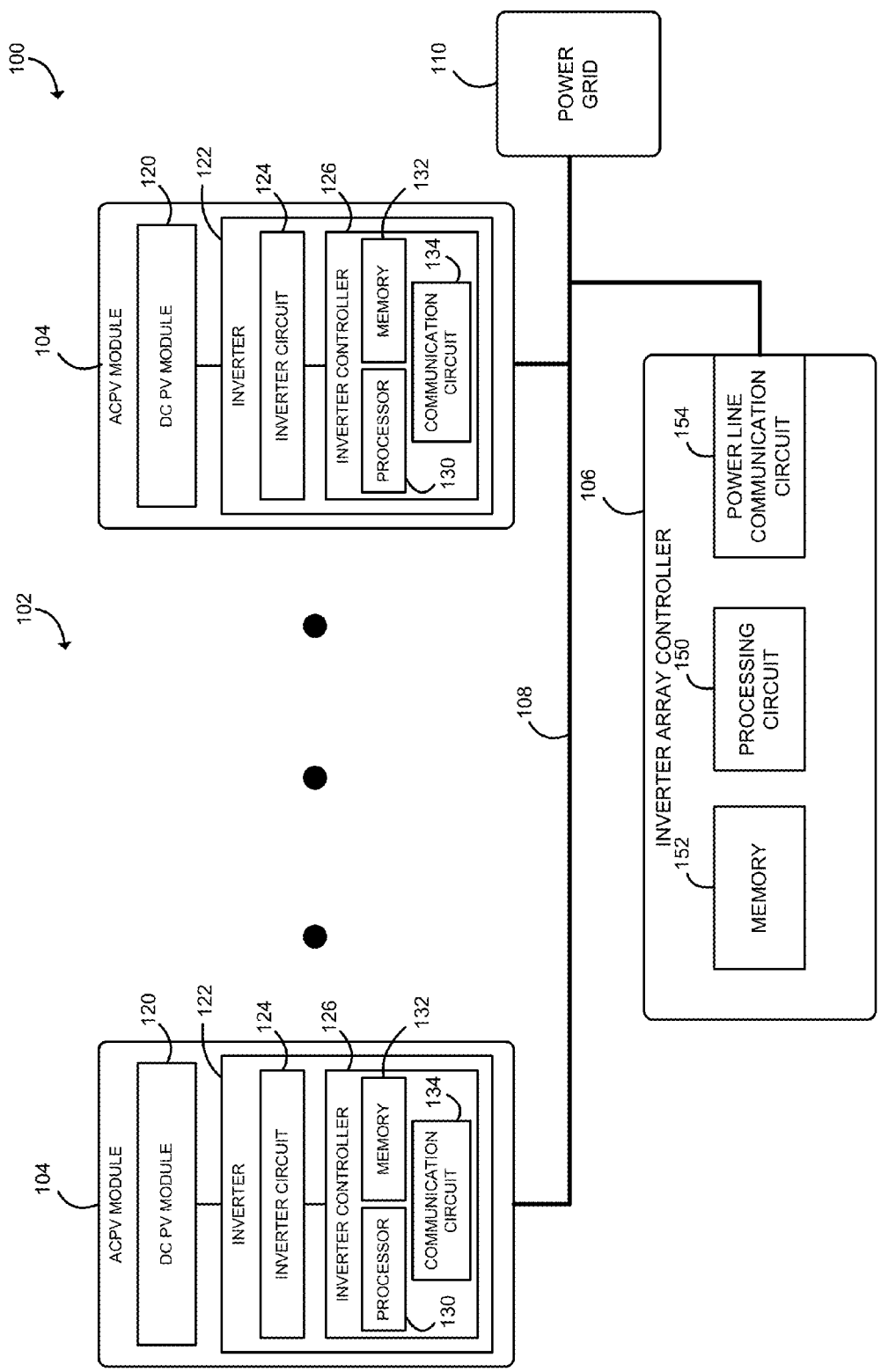
FIG. 1 is a simplified block diagram of one embodiment of a photovoltaic system for generating alternative energy including an array of power inverters and an inverter array controller.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, in one embodiment, a system 100 for generating alternative energy includes an array 102 of alternative energy source module 104 and an inverter array controller 106 electrically coupled to each alternative energy source module 104 via an alternating current ("AC") power line(s) 108. The alternative energy source modules 104 are configured to convert direct current ("DC") power from an alternative energy source to AC power, which may be supplied to an AC power grid 110 (and/or a load coupled to the grid 110) via the power line(s) 108. In the illustrative embodiment, the alternative energy source modules 104 are embodied as photovoltaic modules configured to convert solar energy to AC power. However, in other embodiments, other types of alternative energy sources may be used such as, for example, fuel cells, DC wind turbines, DC water turbines, and/or other alternative energy sources. Additionally, although only two alternative energy source modules 104 are illustrated in FIG. 1, it should be appreciated that the array 102 may, and in many applications will, include a greater number of modules 104 as indicated by the ellipses in FIG. 1. For example, in some embodiments, the array 102 may include ten, fifty, one hundred, or more alternative energy source modules 104.

The array 102 of alternative energy source modules 104 may be located remotely from the inverter array controller 106. For example, each module of the array 102 may be located on a roof of a building or at a designated location (e.g., at a solar panel "farm"), while the inverter array controller 106 is located in a separate location. Additionally, the alternative energy source modules 104 may or may not be located near each other. For example, the array 102 may be embodied as a plurality of sub-arrays, each located apart from each other and having a plurality of alternative energy source modules 104. Additionally, although a single AC power line 108 is illustrated as coupling the modules 104 to the controller 106 in FIG. 1, it should be appreciated that the AC power line 108 may be embodied as a plurality of AC power lines in other embodiments.

As discussed above, each of the illustrative alternative energy source modules 104 is embodied as a photovoltaic module configured to convert solar energy to an AC power. As such, in the illustrative embodiment, each module 104 includes a DC photovoltaic module 120 and an inverter 122. The DC photovoltaic module 120 may be embodied as one or more photovoltaic cells and is configured to deliver DC power to the inverter 122 in response to receiving an amount of sunlight. Of course, the DC power delivered by DC photovoltaic module 120 is a function of environmental variables, such as, e.g., sunlight intensity, sunlight angle of incidence and temperature. The inverter 122 is configured to convert the DC power generated by the DC photovoltaic module 120 to AC power. In some embodiments, the inverter 122 and the DC photovoltaic module 120 are located in a common housing. Alternatively, the inverter 122 may include its own housing secured to the housing of the DC photovoltaic module 120.

Additionally, in some embodiments, the inverter 122 is separate from the housing of the DC photovoltaic module 120, but may be located nearby.

Each of the illustrative inverters 122 includes a DC-to-AC inverter circuit 124 and an inverter controller 126. The DC-to-AC inverter circuit 124 is configured to convert the DC power generated by the DC photovoltaic module 120 to AC power at the grid frequency of the power grid 110. One of a number of various inverter topologies and devices may be used in the DC-to-AC inverter circuit 124. Examples of inverter topologies that may be used in the inverter circuit 124 are described in, for example, U.S. patent application Ser. No. 12/563,499, entitled "Apparatus for Converting Direct Current to Alternating Current" by Patrick L. Chapman et al., filed on Sep. 21, 2009 and in U.S. patent application Ser. No. 12/563,495, entitled "Apparatus and Method for Controlling DC-AC Power Conversion" by Patrick L. Chapman et al., filed on Sep. 21, 2009.

The operation of the inverter circuit 124 is controlled and monitored by the inverter controller 126. The illustrative inverter controller 126 includes a processor 130, a memory 132, and a power line communication circuit 214. Additionally, the inverter controller 126 may include other devices commonly found in controllers, which are not illustrated in FIG. 1 for clarity of description. Such additional devices may include, for example, peripheral devices, data storage devices, input/output ports, and/or other devices.

The processor 130 of the inverter controller 126 may be embodied as any type of processor capable of executing software/firmware, such as a microprocessor, digital signal processor, microcontroller, or the like. The processor 130 is illustratively embodied as a single core processor, but may be embodied as a multi-core processor having multiple processor cores in other embodiments. Additionally, the inverter controller 126 may include additional processors 130 having one or more processor cores in other embodiments.

The memory 132 of the inverter controller 126 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 132 is communicatively coupled to the processor 130 via a number of signal paths, such as a data bus, point-to-point interconnection, or other interconnection. Although only a single memory device 132 is illustrated in FIG. 1, in other embodiments, the inverter controller 126 may include additional memory devices. Various data and software may be stored in the memory device 132. For example, applications, programs, libraries, and drivers that make up the firmware executed by the processor 130 may reside in memory 132.

The power line communication circuit 134 may be embodied as any number of devices and circuitry for enabling communications between the inverter 122 (i.e., the inverter controller 126) and the controller 106. In the illustrative embodiment, the communication circuit 134 is configured to communicate with the controller 106 over the AC power line(s) 108 and may use any suitable power line communication protocol to effect such communication.

As discussed above, the inverter array controller 106 is configured to monitor and/or control the operation of the alternative energy source modules 104 (i.e., the inverters 122). The illustrative inverter array controller 106 includes a processing circuit 150, a memory 152, and a power line communication circuit 154. Additionally, the inverter array controller 106 may include other devices commonly found in controllers, which are not illustrated in FIG. 2 for clarity of description. Such additional devices may include, for example, peripheral devices, data storage devices, input/output ports, and/or other devices.

The processing circuit 150 of the inverter array controller 106 may be embodied as any type of processor or processing circuit capable of executing software/firmware, such as a microprocessor, digital signal processor, microcontroller, or the like. The processing circuit 150 is illustratively embodied as a single core processor, but may be embodied as a multi-core processor having multiple processor cores in other embodiments. Additionally, the processing circuit 150 may be embodied as additional processors and associated circuits in other embodiments.

The memory 152 of the inverter array controller 106 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 152 is communicatively coupled to the processing circuit 150 via a number of signal paths, such as a data bus, point-to-point interconnection, or other interconnection. Although only a single memory device 152 is illustrated in FIG. 1, in other embodiments, the inverter array controller 106 may include additional memory devices. Various data and software may be stored in the memory device 152. For example, applications, programs, libraries, and drivers that make up the software/firmware executed by the processing circuit 150 may reside in memory 152.

Similar to the communication circuit 134, the communication circuit 154 may be embodied as any number of devices and circuitry for enabling communications between the controller 106 and the inverters 122. In the illustrative embodiment, the communication circuit 154 is configured to communicate with the communication circuit 134 of the inverters 122 over the AC power line(s) 108 and may use any suitable power line communication protocol to effect such communication. For example, in some embodiments a frequency shift keying (FSK) modulation protocol using a half-duplex communication link may be used. In one particular embodiment, the communication circuit 154 is configured to use the CENELEC B power line communication protocol but may be use other protocols in other embodiments such as those protocols including a form of error detection and/or correction.

In use, the inverter array controller 106 may control the operation of the inverter controllers 126, request information and data from the inverter controllers 126, and provide instructions and data to the inverter controllers 126. To do so, the inverter array controller 106 communicates with the inverters 122 over the AC power line(s) 108 as discussed above. However, depending on the configuration of the array 102 and/or the location of the individual inverter 122 in the array 102, communications between the inverter 122 and the inverter array controller 106 may be adversely affected. As such, as discussed in more detail below, the inverter array controller 106 may utilize another inverter 122 of the array 102 as a "relay inverter" to relay messages to a non-responsive inverter 122.

Figure 2:
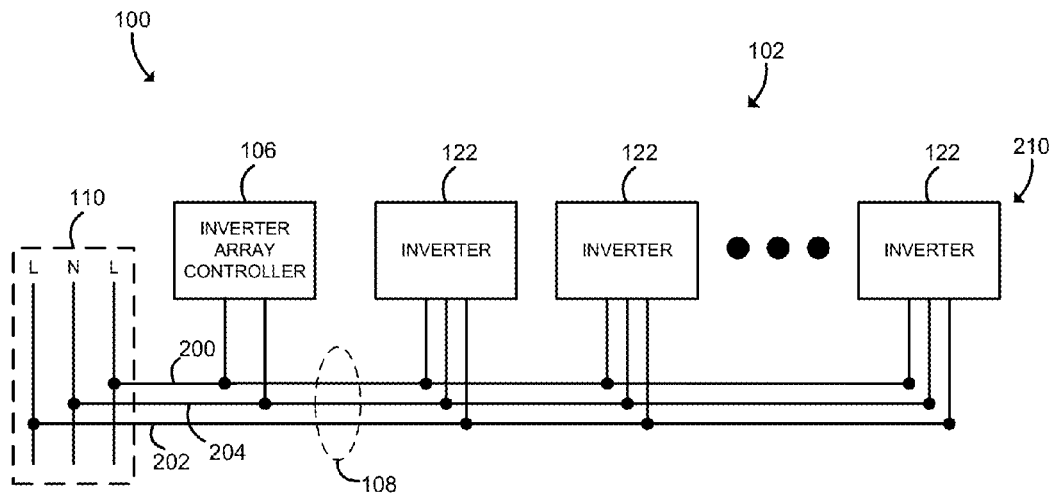
FIG. 2 is a simplified block diagram of the system of FIG. 1 showing the interconnection of the array of power inverters and the inverter array controller to an AC grid.
Figure 3:
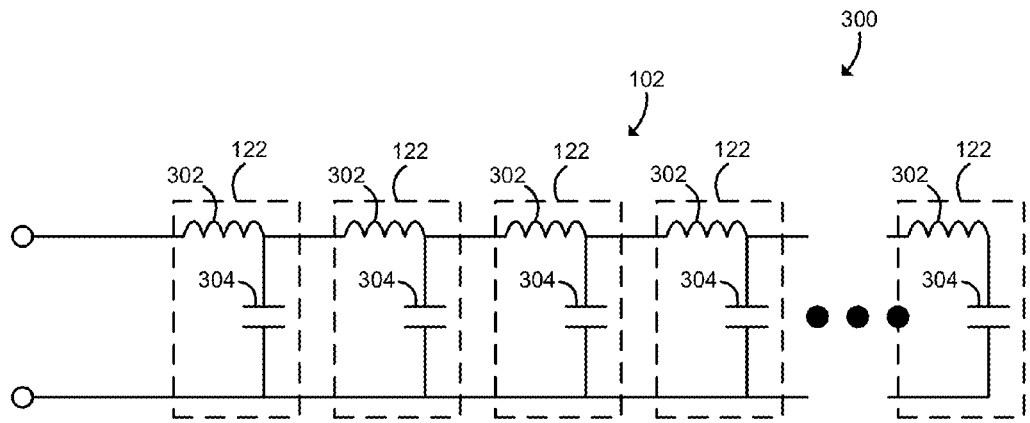
FIG. 3 is a simplified electrical schematic of one embodiment of an equivalent circuit of the array of power inverters of FIG. 2.

Referring now to FIGS. 2 and 3, in the illustrative embodiments, the inverter array controller 106 and each of the inverters 122 of the corresponding alternative energy source module 104 are coupled in parallel with each other to the AC power line 108, which may be coupled to the power grid 110. Again, although the illustrative array 102 of FIG. 2 includes only three inverters 122, the array 102 may include a larger number of inverters in other embodiments (i.e., the inverter array controller 106 may control a larger number of inverters). Additionally, the array 102 may form a sub-array of a larger array in some embodiments. In such embodiments, the additional sub-arrays may be coupled in parallel with the array 102 to the inverter array controller 106 and the power grid 110 such that a single inverter array controller 106 may control multiple arrays 102. Alternatively, in other embodiments, each sub-array may include its own inverter array controller 106.

The illustrative power grid AC power line 108 is embodied as a three-wire cable including a pair of line wires 200, 204 and a neutral wire 204. Power is delivered from the inverters 122 to the power grid 110 via the line wires 200, 204. As shown in FIG. 2, the inverter array controller 106 is coupled to one of the line wires 200 and the neutral wire 204. As such, power line communications between the inverter array controller 106 and the inverters 122 occur via the line-to-neutral (L-N) coupling.

An equivalent circuit 300 of the array 102 of inverters 122 is shown in FIG. 3. The equivalent circuit 300 is embodied as a distributed impedance network formed from the circuit characteristics of the inverters 122 of the array 102 and the interconnecting power line cable 108. For example, in FIG. 3, each inverter 122 is represented by a corresponding inductor-capacitor (LC) network including an inductor 302 and a capacitor 304. Each inductor 302 represents the inductance of the cable connector, and associated wiring, through which the corresponding inverter 122 is coupled to the power line cable 108 and the inductance of the power line cable 108 section associated with the corresponding inverter 122. The capacitor 304 represents the input capacitance of the corresponding inverter 122 and the capacitance of the power line cable 108 section associated with the corresponding inverter 122. Illustratively, each inductor 302 is embodied as a 1 mH inductor and each capacitor 304 is embodied as a 1 nF capacitor. Of course, it should be appreciated that in some embodiments, arrays 102 of inverters 122 having a more complex structure (and, therefore, a more complex equivalent circuit 300) may be used in the system 100.

Figure 4:
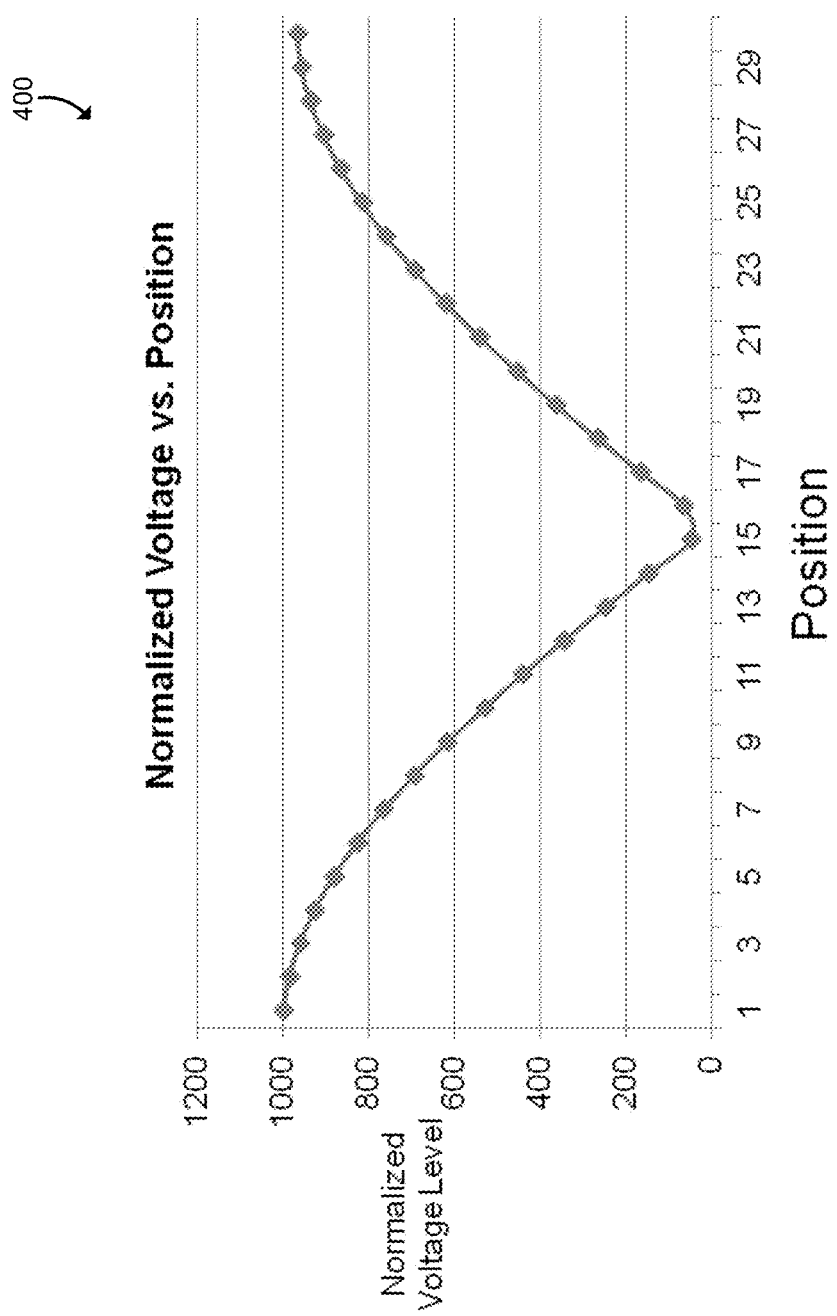
FIG. 4 is a simplified graph of one embodiment of power inverter communications that can occur in the system of FIGS. 1-3 and illustrates a normalized voltage level of the received communications by the inverter array controller verses the position of the communication-transmitting power inverter.

In alternative energy generation systems having arrays 102 of inverters 122 similar to the configurations shown in FIGS. 1-3, the effectiveness of the power line communication between the inverters 122 and the inverter array controller 106 has been determined to be a function of the location of the individual inverter 122 within the array 102. That is, the magnitude of the voltage of a power line communication sent from an inverter 122 and received by the inverter array controller 106 may vary, generally non-linearly, with the distance between the inverter 122 and the inverter array controller 106. For example, a graph 400 showing a normalized voltage level of a power line communication message received from inverters 122 of an array 102 versus the position within the array of each inverter 122 is shown in FIG. 4. As shown in the graph 400, a power line communication received by the inverter array controller 106 from the middle inverters 122 (e.g., inverter numbers 13-17) has a much lower voltage level relative to inverters 122 nearer or farther away from the associated inverter array controller 106. That is, the middle inverters are located in a communication "null" in which the power line communications from those middle inverters 122 to the inverter array controller 106 are adversely attenuated. Additionally, such communication "nulls" can occur between inverters 122 of an array 102. For example, in the embodiment of FIG. 4, two inverters 122 located fifteen nodes (i.e., inverters 122) apart may receive power line communications from each other having the low normalized voltage level as shown for inverter number "15" in FIG. 4.

Depending on the severity of the communication null, communications between the inverter 122 within the null and the inverter array controller 106 (or other inverter 122) may have such a reduced voltage level that such communications are simply not received by each other. The communication null illustrated in FIG. 4 is due to the configuration of the array 102, the resultant equivalent LC circuit, and the frequency of the communication, which can cause attenuation of signals over particular distances. It should be appreciated that a single array may have one or more communication nulls and that such communication nulls may occur at various locations within the array (i.e., centered on various inverters 122 of the array 102) depending on the configuration, layout, communication frequency, and surrounding conditions of the array 102. Although the inverter array controller 106 may utilize a re-try algorithm to attempt communicating with the inverters 122 located in a communication null, such re-try attempts are likely not to be successful due to the consistent attenuation of the power line communication between the inverter array controller 106 and the affected inverters 122.

Figure 5:
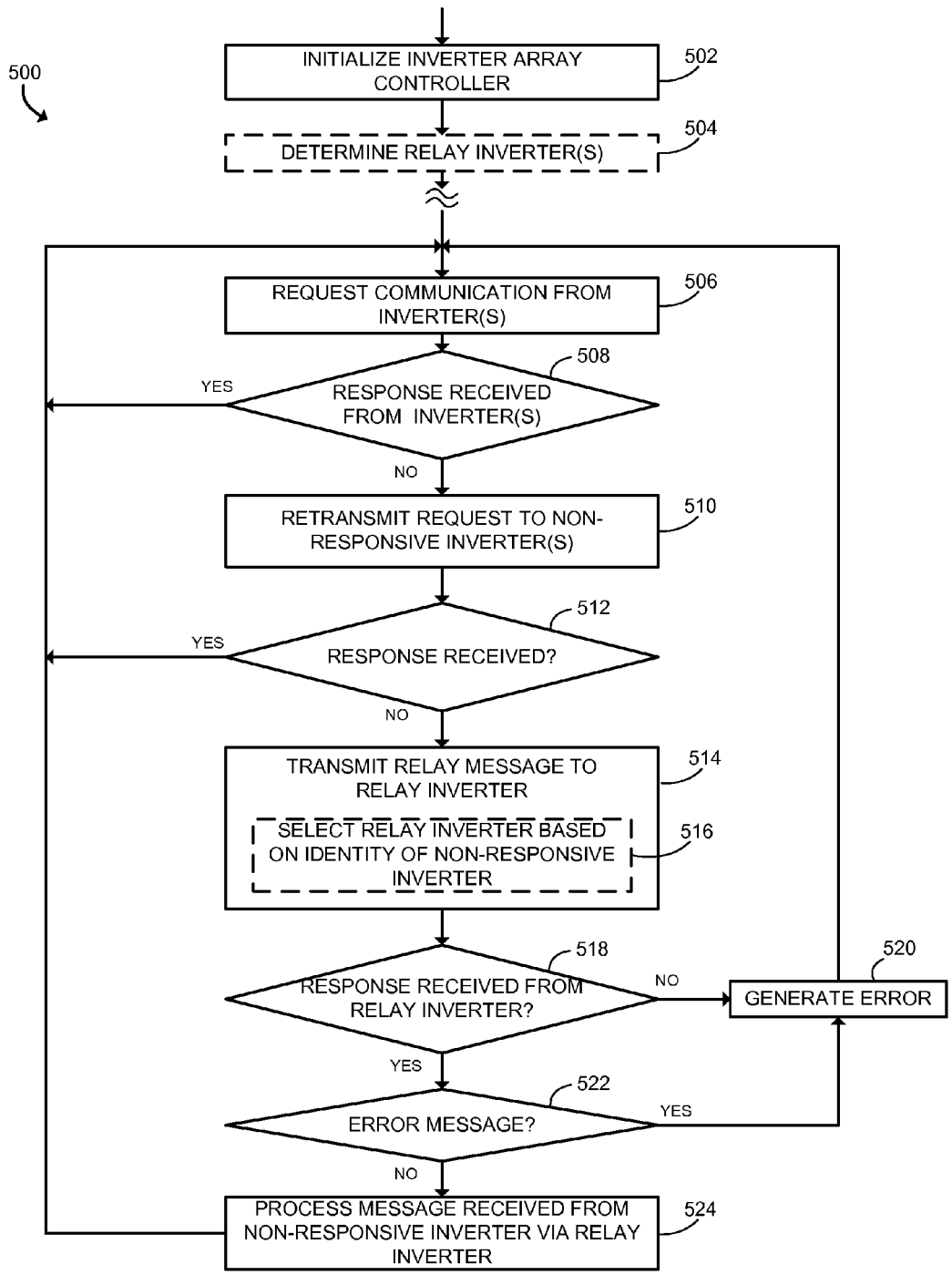
FIG. 5 is a simplified flow diagram of one embodiment of a method for communication with an array of power inverters that may be executed by the inverter array controller of FIG. 1.

Referring now to FIG. 5, in one embodiment, a method 500 for communicating with the inverters 122 of the array 102 may be executed by the inverter array controller 106. The method 500 begins with block 502 in which the inverter array controller 106 is initialized. During the initialization procedure, the inverter array controller 106 may perform various system checks, such as memory validations, load executable software/firmware, and/or otherwise prepare for controlling and communicating with the inverters 122 of the array 102.

Subsequently, or as part of the initialization of block 502, the inverter array controller 106 may determine which power inverters 122 of the array 102 are to be used as relay inverters. As discussed in more detail below, a relay inverter is a power inverter 122 of the array 102 selected to relay communications from the inverter array controller 106 to inverters 122 located in communication nulls. In some embodiments, the relay inverters are pre-selected and identification data that identifies the relay inverters may be stored in the inverter array controller 106 (e.g., in memory 152). In such embodiments, the relay inverters may be selected based on, for example, the location of the inverter 122 within the array 102, the location of the inverter 122 relative to the inverter array controller 106, the configuration of the array 102, and/or other criteria or factors useable to select at least one inverter 122 of the array 102 that is not located in a communication null relative to the inverter array controller 106.

Figure 6:
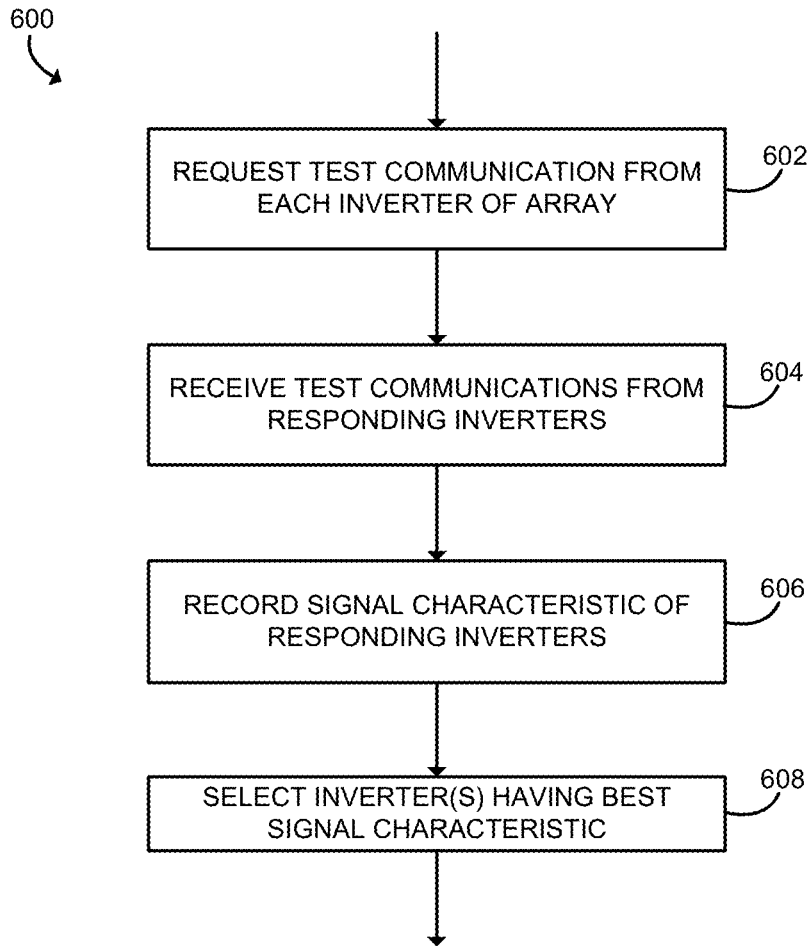
FIG. 6 is a simplified flow diagram of one embodiment of a method for determining a relay inverter of the array of power inverters that may be executed by the inverter array controller of FIG. 1.

Alternatively, in some embodiments, the inverter array controller 106 is configured to dynamically or automatically determine, or otherwise select, one or more power inverters 122 as the relay inverter(s) 122. To do so, for example, the inverter array controller 106 may execute a method 600 for determining at least one relay inverter from the array 102 of power inverters 122 as shown in FIG. 6. The method 600 begins with block 602 in which the inverter array controller 106 transmits a request for a test communication from each power inverter 122 of the array 102. Such request communication may be embodied as, for example, a broadcast communication from the inverter array controller 106, which is to be received by each power inverter 122 of the array 102 (assuming no communication nulls). In block 604, the inverter array controller 106 receives the test communication responses from each responding power inverter 122 of the array 102. Such test communication response may be embodied as any type of power line communication message, such as a simple acknowledgement. Of course, those power inverters 122 located in a communication null may not receive, or otherwise be able to interpret, the original request communication transmitted by the inverter array controller 106 due to the voltage attenuation occurring at the communication null. Similarly, even if an inverter 122 located in a communication null did receive the request communication from the inverter array controller 106, the test communication response from that inverter 122 may not be received, or otherwise be properly interpreted, by the inverter array controller 106.

Accordingly, in block 606, the inverter array controller 106 records one or more signal characteristics of the test communication response received from each responding inverter 122 of the array 102. Subsequently, in block 608, the inverter array controller 106 selects one or more inverters 122 of the array 102 to be the relay inverter based on the recorded signal characteristic (e.g. having the best signal characteristic). The signal characteristic recorded and compared in blocks 606, 608 may be embodied as any characteristic of the test communication response signal received from each responding inverter 122 that may be compared to each other to determine the relay inverter(s). For example, in some embodiments, the signal characteristic may be embodied as the signal amplitude, the signal integrity, the signal-to-noise ratio, the response time, or other characteristic of the test communication response signal received from each of the responding inverters 122. Of course, in other embodiments, other criteria may be used in place of, or in addition to, the signal characteristic(s) of the test communication responses such as, for example, the number of inverters in the array 102, the configuration of the array 102, historical communication data, and/or the like.

Of course, in other embodiments, other methodologies for determining or selecting the relay inverter(s) from the array 102 of power inverters 122 may be used. For example, it has been determined that the last inverter in an array 102 of power inverters 122 (i.e., the inverter 122 having the greatest communication distance to the inverter array controller 106, such as the inverter 210 of FIG. 2) may exhibit the most effective communication with the inverter array controller 106. That is, the communication from the last inverter 210 of the array 102 received by the inverter array controller 106 may have the largest amplitude, best signal-to-noise-characteristic, or other signal characteristic relative to the other inverters 122 of the array 102. Conversely, it has been determined that the inverters 122 closest to the inverter array controller 106 (e.g., the inverter 122 having the least communication distances to the inverter array controller 106) may be located in a communication null and exhibit the least effective communication with the inverter array controller 106. As such, in those embodiments in which the configuration or structure of the array 102 is known, predetermined, or otherwise discoverable by the inverter array controller 106, the controller 106 may select the last inverter 210 of the array 102 as the relay inverter or one of the relay inverters.

Referring back to FIG. 5, after the relay inverter(s) 122 has been selected or otherwise determined, the inverter array controller 106 may, periodically or occasionally, request communication from one or more power inverters 122 of the array 102 in block 506. Such requested communication may be embodied as any type of request such as, without limitation, a request for operational data, a request to acknowledge instructions, a heartbeat request, and/or the other types of communications. In block 508, the inverter array controller 106 determines whether a response was received from each power inverter 122 from which a communication was requested in block 506. For example, in some embodiments, the inverter array controller 106 may transmit a broadcast requests in block 506 that request each power inverter 122 of the array 102 to respond (e.g., with particular operational data). In such embodiments, the inverter array controller 106 determines whether a response was received from each power inverter 122 of the array 102. If so, the method 500 loops back to block 506 in which the inverter array controller 106 may request additional communications at some later time.

However, if a response was not received from one or more of the inverters 122 to which the request was directed in block 506, the method 500 advances to block 510 in which the inverter array controller 106 retransmits the request for communication to the non-responsive inverter(s) 122. That is, the inverter array controller 106 retransmits the request to any inverter 122 that did not respond to the request transmitted in block 506 or otherwise responded with a communication that was not received or cannot be interpreted by the inverter array controller 106 (e.g., the voltage level of the response communication is too low to be received or interpreted by the controller 106). In block 512, the inverter array controller 106 again determines whether a response to the retransmitted request is received from each of the non-responsive inverters 122. If so, the method 500 loops back to block 506 in which the inverter array controller 106 may request additional communications at some later time.

In some embodiments, the inverter array controller 106 may be configured to adjust the frequency of the power line communication between the controller 106 and the inverter 122 (or just the non-responding inverter 122) prior to retransmitting the request in block 510. As discussed above, the existence and location of a communication null is dependent upon the circuit characteristics (i.e., the circuit impedance as discussed above with regard to FIG. 3) of the array 102 and the frequency of the power line communication transmission. As such, by adjusting the frequency of the power line communication transmission, the location of the null may be adjusted (i.e., which inverter 122 is located in the communication null). Accordingly, in some embodiments, the inverter array controller 106 may be configured to adjust the frequency of the power line communication transmission and re-attempt to communicate with the non-responsive inverter in block 510. Such additional communication may include instructions to the non-responding inverter 122 to likewise adjust the frequency of the its power line communication transmission when responding back to the inverter array controller 106. In this way, the inverter array controller 106 may be able to establish communications with the non-responding inverter 122 by changing the location of the communication null using a different communication frequency. Such frequency adjustments may be implemented in place of or in addition to the use of a relay inverter as discussed below.

If, however, no response to the request retransmitted in block 508 is received from one or more of the non-responsive inverters 122, the method 500 advances to block 514. In block 514, the inverter array controller 106 transmits a relay message to the identified or selected relay inverter(s) 122. In embodiments in which multiple power inverters 122 have been identified as relay inverters, the inverter array controller 106 may select one of the identified relay inverters 122 to receive the relay message. For example, in one embodiment, the inverter array controller 106 selects one of the identified relay inverters 122 to receive the relay message based on the identity of the non-responsive inverter(s) 122 in block 516. The identity of the non-responsive inverter(s) 122 may be embodied as any type of data capable of identifying the non-responsive inverter(s) 122 including, but not limited to, a virtual or machine address such as a globally unique identifier (GUID), the location of the non-responsive inverter 122 within the array 102, the location of the non-responsive inverter 122 relative to the inverter array controller 106, and/or other data or criteria.

The relay message transmitted by the inverter array controller 106 in block 514 may be embodied as any type of communication message that instructs the relay inverter 122 to retransmit a message from the inverter array controller 106. For example, in some embodiments, the relay message may include the original request message transmitted in block 506 (e.g., the relay message may "wrap" the original request message). Alternatively, the relay message may be embodied as a first relay message that instructs the relay inverter 122 to echo the next message received from the inverter array controller 106, followed by a second relay message that is a retransmission of the original request message transmitted in block 506.

As discussed in more detail below, the relay inverter(s) 122 is used to relay the messages from the inverter array controller 106 to the non-responsive inverter(s) 122, as well as from the non-responsive inverter(s) 104 to the inverter array controller 106. As such, the inverter array controller 106 determines whether a response was received from the relay inverter(s) 122 in block 518. If not, the method 500 advances to block 520 in which an error is generated. Such error may include storing the identity of the non-responsive inverter 122 and/or relay inverter 122, storing additional information related to the non-responsive inverter 122 and/or relay inverter 122, generating a visual or audio alter, and/or providing an error message to a remote computer or server.

If, however, a response is received from the relay inverter 122, the method 500 advances to block 522 in which the inverter array controller 106 determines whether the response is an error message from the relay inverter 122. That is, although a response may be received from the relay inverter 122, such response may be an error message indicating that the relay inverter 122 did not receive a response from the non-responsive inverter 122. If so, the method 500 advances to block 520 in which an error is generated as discussed above. However, if a non-error response is received from the relay inverter(s) 122, the method 500 advances to block 524 in which the inverter array controller 106 processes the message received from the from the non-responsive inverter(s) 122 via the response from the relay inverter(s) 122. In this way, the inverter array controller 106 is capable of communicating with any inverter 122 within the array 102, even those inverters located in an communication null, via use of a relay inverter 122.

Figure 7:
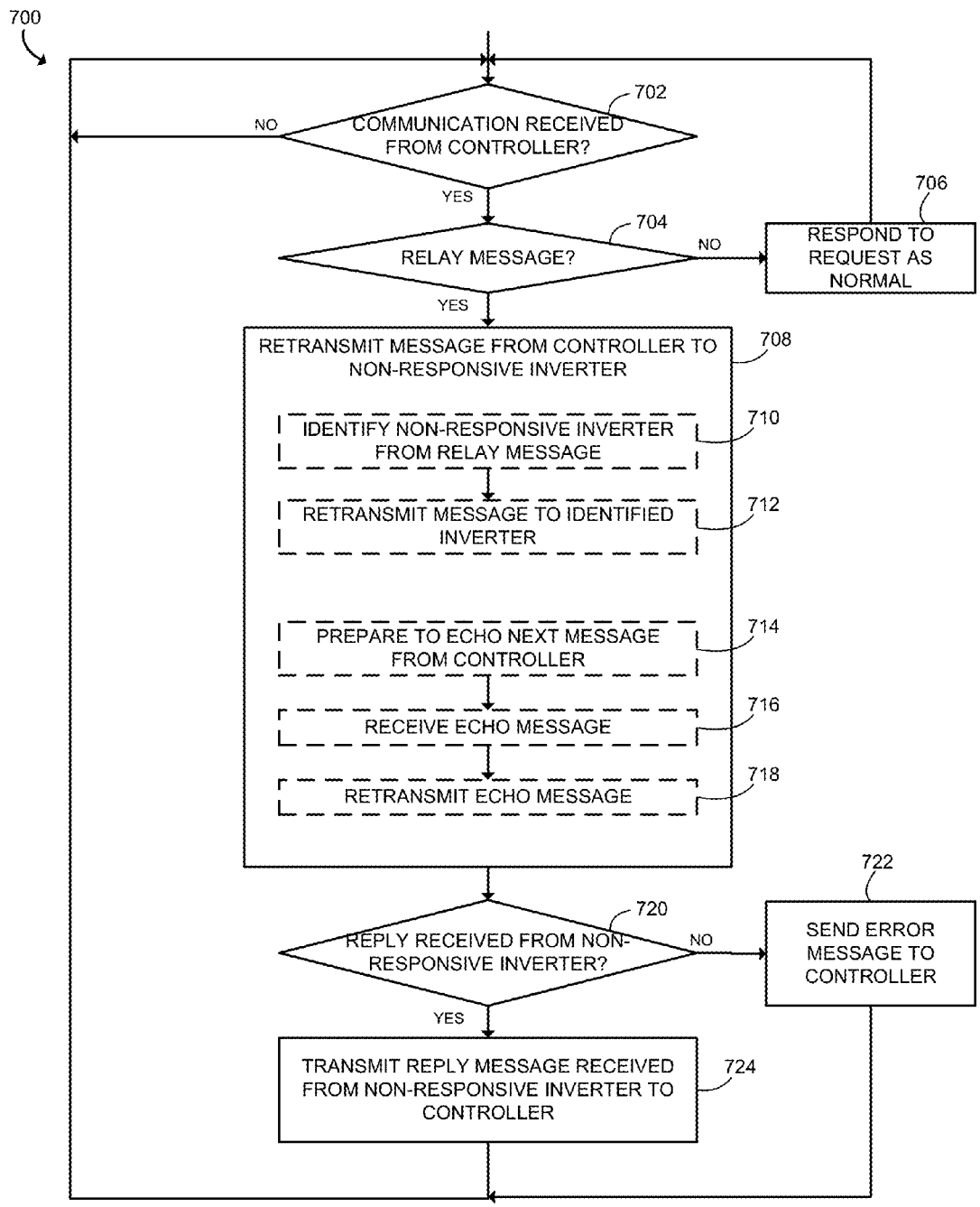
FIG. 7 is a simplified flow diagram of one embodiment of a method to relay communications between the inverter array controller and at least one power inverter, which may be executed by a relay inverter of the array of power inverters.

Referring now to FIG. 7, in one embodiment, each relay inverter 122 of the array 102 may execute a method 700 to relay communications between the inverter array controller 106 and one or more non-responsive inverters 122. The method 700 begins with block 702 in which the relay inverter 122 determines whether a communication has been received from the inverter array controller 106. If so, the method 700 advances to block 704 in which the inverter array 102 determines whether the received communication is a relay message. To do so, the inverter array 102 may analyze the received communication to determine whether the received communication is a relay message. Such determination may be based on the metadata of the received communication, instructions included in the received communication, the type of communications, and/or other aspects of the received communication. If the received communication is determine not to be a relay message, the method 700 advances to block 706 in which the relay inverter 122 responds (if required) to the received communication as normal. If, however, the received communication is determined to be a relay message, the method 700 advances to block 708.

In block 708, the relay inverter 122 retransmits a message from the inverter array controller 106 to one or more non-responsive inverters 122. As discussed above, the message retransmitted by the relay inverter 122 may be included in the relay message received in block 704. As such, in some embodiments, the relay inverter 122 identifies the non-responsive inverter 122 based on the relay message in block 710. To do so, for example, the relay inverter 122 may retrieve identification data from the relay message that identifies the non-responsive inverter 122. Such identification data may be embodied may be embodied as any type of data capable of identifying the non-responsive inverter 122 such as, for example, a virtual or machine address (e.g., a GUID).

After the non-responsive inverter 122 has been identified by the relay inverter 122, the relay inverter 122 retransmits the message from the inverter array controller 106 to the non-responsive inverter 122 in block 712. To do so, in some embodiments, the relay inverter 122 may simply retransmit the relay message received from the inverter array controller 106 in block 704. Alternatively, the relay inverter 122 may extract a message included in the relay message (e.g., wrapped by the relay message) and retransmit only the extracted message to the non-responsive inverter 122 in block 712.

In some embodiments, the message to be retransmitted by the relay inverter is embodied as a subsequent message received from the inverter array controller 106, which is to be echoed to the non-responsive inverter(s) 122. In such embodiments, the relay message received in block 704 instructs the relay inverter 122 to echo the next message received from the inverter array controller 106. As such, the relay inverter 122 prepares to echo the next message received from the inverter array controller 106 in block 714 and subsequently receives the next message from the inverter array controller 106 in block 716. In block 718, the relay inverter retransmits the subsequent message received from the inverter array controller 106 in block 716 to the non-responsive inverter 122. As discussed above, the relay inverter 122 may identify the non-responsive inverter 122 based on metadata or other data associated with the first or second relay messages received from the inverter array controller 106.

After the relay inverter 122 has retransmitted the message from the inverter array controller 106 to the non-responsive inverter 122, the method 700 advances to block 720. In block 720, the relay inverter determines whether a reply has been received from the non-responsive inverter 122. For example, in some embodiments, the relay inverter 122 is configured to wait a predetermined amount of time for such a reply. The reply may be embodied as a simple acknowledgement or a message including, for example, data requested by the inverter array controller. If no reply is received from the non-responsive inverter 122 in block 720, the relay inverter 122 transmits an error message to the inverter array controller 106 in block 722 to inform the controller 106 that the non-responsive inverter 122 has failed to reply to the relay inverter. However, if a reply is received from the non-responsive inverter 122, the method 700 advances to block 724 in which the relay inverter 122 retransmits the reply message received from the non-responsive inverter 122 to the inverter array controller 106. In this way, non-responsive inverter 122 is capable of communicating with the inverter array controller 106 via the relay inverter 122.

It should be appreciated that, although the methods 500, 600, and 700 have been described above with regard to DC-to-AC power inverters, the concepts described therein are equally applicable to DC-to-DC and AC-to-DC converters. That is, although the power line communication is carried by the power line cable 108, the power line communication has a signal frequency (e.g., about 110 kHz) different from the AC power line frequency, which is typically 50 Hz or 60 Hz. As such, the techniques described above can be implemented on a system in which the power line frequency has a different frequency from the power line communication including, for example, a frequency of about 0 Hz (e.g., embodiments in which the converters generate a DC output). Similar to AC output systems, such DC output systems may also exhibit communication nulls based on the circuit characteristics, the configuration of the converters, and other factors.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. An inverter array controller for maintaining and communicating with an array of power inverters, each power inverter being configured to convert direct current (DC) power generated by an alternative energy source to alternating current (AC) power, the inverter array controller comprising:
   a power line communication circuitry to communicate with the array of power inverters over a power line connecting the inverter array controller to each of the power inverters of the array of power inverters;
   a processing circuitry; and
   a memory device having stored therein a plurality of instructions, which when executed by the processing circuitry, result in the inverter array controller:
   transmitting, using the power line communication circuitry, a first message to a first power inverter of the array of power inverters;
   determining whether a response was received from the first power inverter;
   transmitting, by the power line circuitry and in response to failing to receive the response from the first power inverter, a relay message to a second power inverter of the array of power inverters, the relay message including the first message and instructing the second inverter to transmit the first message to the first power inverter; and
   receiving, with the power line circuitry and from the second power inverter, a response message transmitted to the second power inverter from the first power inverter, wherein the response message is indicative of a response of the first power inverter to the first message.

2. The inverter array controller of claim 1, wherein the first message is a broadcast message to each power inverter of the array of power inverters that requests each power inverter to respond to the broadcast message.

3. The inverter array controller of claim 1, wherein the plurality of instructions further result in the inverter array controller selecting the second power inverter to receive the relay message from the array of power inverters.

4. The inverter array controller of claim 3, wherein selecting the second power inverter comprises selecting the second power inverter from the array of power inverters based on a signal characteristic of a communication received from the second power inverter.

5. The inverter array controller of claim 4, wherein selecting the second power inverter comprises:

requesting a test communication from each power inverter of the array of power inverters;
recording a signal characteristic for each communication received in response to the test communication; and
selecting the second power inverter from the array of power inverters based on signal characteristic of the communication received from the second power inverter in response to the test communication.

6. The inverter array controller of claim 3, wherein selecting the second power inverter comprises:
   identifying the first power inverter that did not respond to the first message; and
   selecting the second power inverter based on the identity of the first power inverter.

7. The inverter array controller of claim 6, wherein identifying the first power inverter comprises identifying the location of the first power inverter, relative to the other power inverters, within the array of power inverters.

8. The inverter array controller of claim 1, wherein transmitting the relay message comprises:
   transmitting a first relay message to the second power inverter that instructs the second power inverter to echo the next received message; and
   transmitting a second relay message, including the first message, to the second power inverter.

9. A power inverter of an array of power inverters, each power inverter being configured to convert direct current (DC) power generated by an alternative energy source to alternating current (AC) power, the power inverter comprising:
   a power line communication circuit to communicate with an inverter array controller over a power line connecting the power inverter to the inverter array controller and other power inverters of the array of power inverters;
   an inverter circuit to convert the DC power to the AC power; and
   an inverter controller to control operation of the inverter circuit, the inverter controller to:
   receive a message from the inverter array controller using the power line communication circuit;
   determine whether the message is a relay message,
   retransmit, by the power line communication circuit and in response to determining the message is a relay message, the relay message to a non-responsive power inverter of the array of power inverters that has not responded to a previous communication from the inverter array controller;
   receiving, with the power line communication circuit and in response to retransmitting the relay message, a response from the non-responsive power inverter; and
   transmit the response, using the power line communication circuit, to the inverter array controller.

10. The power inverter of claim 9, wherein to determine whether the message received from the inverter array controller is a relay message comprises to determine whether the message instructs the power inverter to transmit a message to the non-responsive power inverter.

11. The power inverter of claim 9, wherein to retransmit the relay message comprises to identify the non-responsive power inverter as a function of the relay message.

12. The power inverter of claim 11, wherein to retransmit the relay message comprises to:
   extract a first message from the relay message, the first message having been previously sent by the inverter array controller; and
   transmit the first message to the non-responsive power inverter.

13. The power inverter of claim 9, wherein the relay message is a second relay message, and the inverter controller is further to:
- receive a first relay message from the inverter array controller that instructs the power inverter to echo the next received message from the inverter array controller; and
- receive the second relay message from the inverter array controller,
- wherein to retransmit the relay message comprises to retransmit, in response to receiving the first and second relay messages, the second relay message to the non-responsive power inverter of the array of power inverter.

14. A method for communicating with an array of power inverters, each power inverter being configured to convert direct current (DC) power generated by an alternative energy source to alternating current (AC) power, the method comprising:
- transmitting, by a power line communication circuitry, a first message to a power inverter of the array of power inverters;
- transmitting, by the power line communication circuitry and in response to failing to receive a response from the power inverter, a relay message to another power inverter of the array of power inverters, the relay message including the first message and instructing the another inverter to transmit the first message to the power inverter; and
- receiving, with the power line circuitry and from the another power inverter, a response message transmitted to the another power inverter from the power inverter, wherein the response message is indicative of a response of the power inverter to the first message.

15. The method of claim 14, wherein transmitting the first message comprises transmitting a broadcast message to each power inverter of the array of power inverters that requests each power inverter to respond to the broadcast message.

16. The method of claim 14, further comprising selecting the another power inverter to receive the relay message from the array of power inverters.

17. The method of claim 16, wherein selecting the another power inverter comprises selecting the another power inverter from the array of power inverters based on a signal characteristic of a communication received from the another power inverter.

18. The method of claim 17, wherein selecting the another power inverter comprises:
- requesting a test communication from each power inverter of the array of power inverters;
- recording a signal characteristic for each communication received in response to the test communication; and
- selecting the another power inverter from the array of power inverters based on signal characteristic of the communication received from the another power inverter in response to the test communication.

19. The method of claim 16, wherein selecting the another power inverter comprises:
- identifying the power inverter that did not respond to the first message; and
- selecting the another power inverter based on the identity of the power inverter.

20. The method of claim 19, wherein identifying the power inverter comprises identifying the location of the power inverter, relative to the other power inverters, within the array of power inverters.

21. The method of claim 14, wherein transmitting the relay message comprises:
- transmitting a first relay message to the another power inverter that instructs the another power inverter to echo the next received message; and
- transmitting a second relay message, including the first message, to the another power inverter.

22. The inverter array controller of claim 1, wherein failure to receive the response from the first power inverter is indicative of a communication null.

23. A method for handling communications in an array of power inverters, the method comprising:
- determining, on a power inverter, whether a message received from an inverter array controller is a relay message;
- retransmitting, by a power line communication circuitry of the power inverter and in response to determining the message is a relay message, the relay message to a non-responsive power inverter of the array of power inverters that has not responded to a previous communication from the inverter array controller;
- receiving, with the power line communication circuitry and in response to retransmitting the relay message, a response from the non-responsive power inverter; and
- transmitting the response, by the power line communication circuitry, to the inverter array controller.

24. The method of claim 23, wherein determining whether the message received from the inverter array controller is a relay message comprises determining whether the message instructs the power inverter to transmit a message to the non-responsive power inverter.

25. The method of claim 23, wherein retransmitting the relay message comprises identifying the non-responsive power inverter as a function of the relay message.

26. The method of claim 25, wherein retransmitting the relay message comprises:
- extracting a first message from the relay message, the first message having been previously sent by the inverter array controller; and
- transmitting the first message to the non-responsive power inverter.

27. The method of claim 23, wherein the relay message is a second relay message, and further comprising:
- receiving, on the power inverter, a first relay message from the inverter array controller that instructs the power inverter to echo the next received message from the inverter array controller; and
- receiving the second relay message from the inverter array controller,
- wherein retransmitting the relay message comprises retransmitting, in response to receiving the first and second relay messages, the second relay message to the non-responsive power inverter of the array of power inverter.

* * * * *